United States Patent [19]

Yada et al.

[11] Patent Number: 5,004,761

[45] Date of Patent: Apr. 2, 1991

[54] PROCESS FOR CONTINUOUSLY PREPARING ACRYLIC POLYMER GEL

[75] Inventors: Akira Yada, Kusatsu; Shusaku Matsumoto, Kyoto, both of Japan

[73] Assignee: Dai-Ichi Kogyo Seiyaku Co., Ltd., Kyoto, Japan

[21] Appl. No.: 223,851

[22] Filed: Jul. 25, 1988

[30] Foreign Application Priority Data

Jul. 28, 1987 [JP] Japan .................. 62-188230

[51] Int. Cl.$^5$ .................. C08F 2/50; C08F 20/56
[52] U.S. Cl. .................. 522/3; 264/22; 264/85; 264/216; 522/17; 522/79; 522/84; 522/175
[58] Field of Search .................. 522/3, 84

[56] References Cited

U.S. PATENT DOCUMENTS

| | | | |
|---|---|---|---|
| 2,750,320 | 6/1956 | Latham | 522/3 |
| 3,592,882 | 8/1968 | Morita | 522/3 |
| 4,604,411 | 8/1986 | Yada et al. | 522/14 |
| 4,647,598 | 3/1987 | Yada et al. | 522/3 |
| 4,690,788 | 9/1987 | Yada | 522/3 |

FOREIGN PATENT DOCUMENTS 197423 10/1986 European Pat. Off. .

Primary Examiner—Marion E. McCamish
Assistant Examiner—Arthur H. Koeckert
Attorney, Agent, or Firm—Varndell Legal Group

[57] ABSTRACT

A process for continuously and stably preparing an acrylic polymer of a high quality in a high conversion and a high productivity which comprises continuously feeding a synthetic resin film onto a moving support, continuously feeding a monomer or a monomer solution onto the synthetic resin film on the moving support in the form of a thin layer, irradiating a light energy to the thin layer, continuously feeding another synthetic resin film over the thin layer and bringing it into close contact with the thin layer when the thin layer has become substantially nonflowable state, and continuing the irradiation of light energy to produce the polymer.

7 Claims, 2 Drawing Sheets

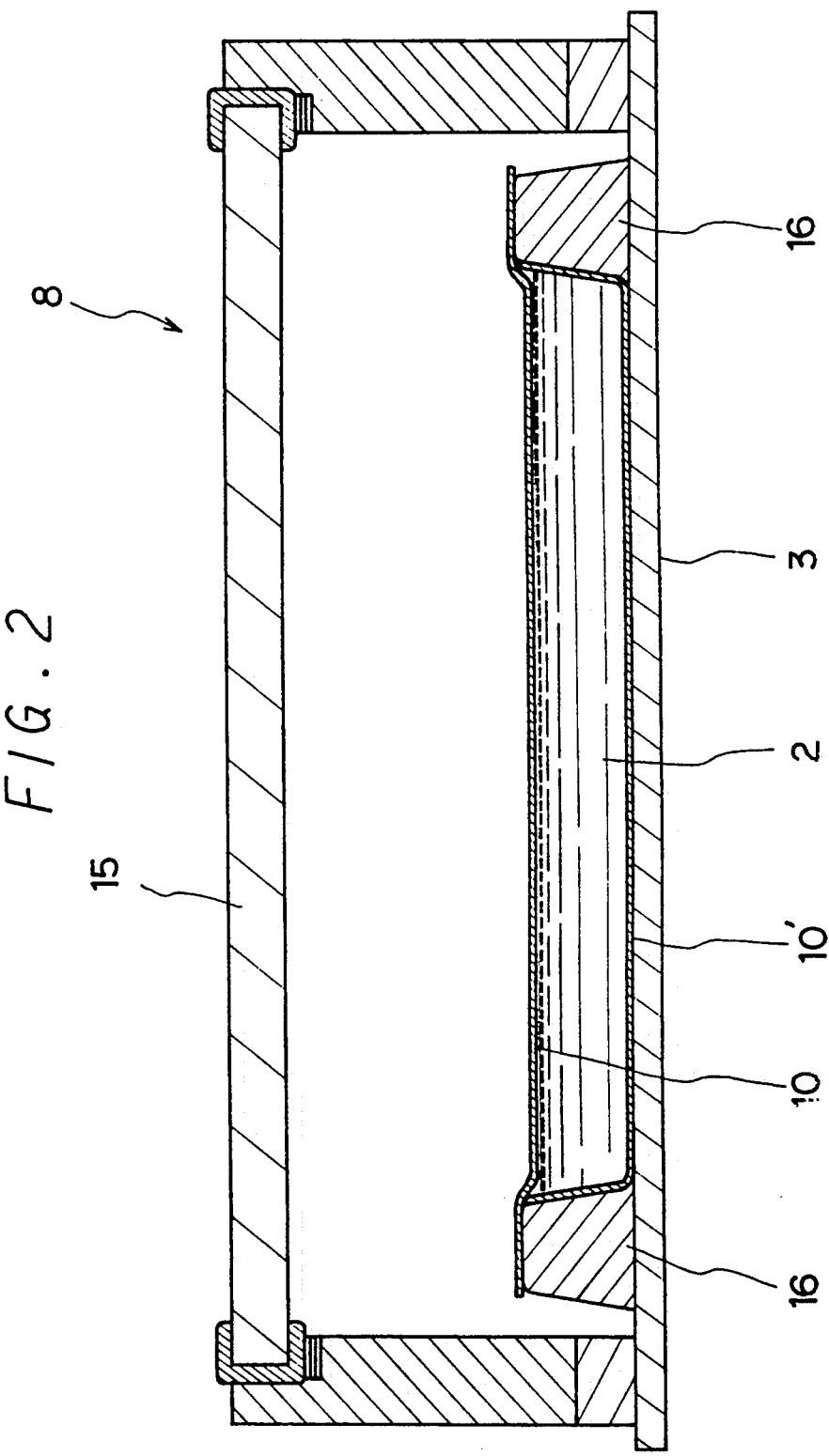

PROCESS FOR CONTINUOUSLY PREPARING ACRYLIC POLYMER GEL

BACKGROUND OF THE INVENTION

The present invention relates to a process for the continuous preparation of an acrylic polymer, and more particularly to an improved process for continuously preparing an acrylic polymer by photopolymerization of a monomer on a moving support.

It is known to prepare acrylic polymers by irradiating light energy to acrylic monomers. It is also known to continuously conduct the polymerization by irradiation to monomers in the form of a thin layer on a moving support such as a belt. In this technique, water-soluble acrylic polymers have been prepared usually by continuously feeding an aqueous monomer solution in the form of a thin layer onto a moving support, irradiating a light energy to the thin layer and continuously taking the produced sheet-like polymer gel off the support.

In general, in the case of polymerizing acrylic monomers by irradiation of light energy using, for example, a ultraviolet lamp, polymers of a good quality cannot be prepared stably unless thorough attention is paid to the following points, namely:

(1) that light energy irradiation conditions are always maintained constant during the polymerization period;

(2) that when the polymerization is conducted in the form of a thin layer on a moving support, the concentration of monomer in a monomer solution does not noticeably change resulting from vaporization of the solvent from the monomer solution (e.g. water when the monomer solution is an aqueous solution) by heat of reaction;

(3) that incorporation of oxygen into the monomer solution which has an adverse influence on the polymerization is completely eliminated during the polymerization period; and (4) that the thickness of the monomer solution and the produced polymer gel on a moving support are controlled constant in the polymerization stage.

In general, from the viewpoint of productivity, it is desirable that the concentration of monomer in a monomer solution is high or the layer of the monomer solution on a moving support is relatively thick. However, in those cases, the quantity of heat generated by the polymerization remarkably increases, and even if the layer is cooled, for example, by cooling the reverse side of the moving support with cold water, complete removal of the heat of polymerization reaction is difficult. Consequently, the upper part of an aqueous monomer solution, which turns to a gel in a short time after irradiation of light energy, becomes in a bumping state. Also, the solvent vaporizes and the monomer concentration remarkably increases at the surface region of the gel. As a result, the concentration of monomer in the gel becomes ununiform, resulting in variation in rate of polymerization and degree of polymerization. Thus, the products having a stable quality cannot be obtained.

Further, the bumping from the surface of the gel results in scattering of the monomer itself. For example, when the monomer solution is irradiated directly with a ultraviolet lamp, the monomer sticks to the surface of lamp, and when a transparent partition plate such as glass or synthetic resin plate is provided between the ultraviolet lamp and the layer of the monomer solution, the monomer sticks to the partition plate. The monomer which has stuck to the surfaces of the lamp or partition plate, converts to a polymer on their surfaces. Thus, the effective output of the ultraviolet lamp, namely illuminance (W/m$^2$), remarkably decreases. Moreover, in the case of long term operation, this decrease progresses with the lapse of time and, therefore, it becomes impossible to carry out the polymerization at a constant illuminance. The change of illuminance with the lapse of time exerts an influence on the rate of polymerization and the degree of polymerization. Thus, it is very difficult to assure a stable quality over a long term. Accordingly, frequent cleaning and washing are required, thus the productivity is remarkably lowered. For such reasons, an improvement has been damanded in this respect.

It is desirable to completely remove oxygen in the polymerization step, namely dissolved oxygen included in a monomer solution and oxygen included in a gas atmosphere in a polymerization apparatus. Removal of oxygen has been usually conducted. In a conventional process where the polymerization is carried out in the form of a thin layer on a moving support, removal of oxygen in the gas atmosphere, in other words, prevention of incorporation of oxygen into the monomer solution or contact of oxygen with the surface of the monomer solution, is conducted, for instance, (1) by installing the moving support in an oxygen-free room, (2) by arranging a gas tight chamber over the moving support and introducing an inert gas such as nitrogen or carbon dioxide to keep an oxygen-free state, or (3) by covering the surface of the monomer with a light-permeable film immediately after feeding the monomer solution onto the moving support.

The above-mentioned method (1) is the most preferable, but requires a high equipment cost because the machine operation in an oxygen-free room must be done by remote control. Also, even if operable, the oxygen-free state in the room must be released once when machine troubles occur or when abnormality in polymerization occurs. Frequent occurrence of such troubles results in marked decrease of productivity and waste of inert gas.

The arrangement of gas tight chamber over a moving support according to the above method (2) has the disadvantage of accompanying a waste of inert gas, since the gas tight chamber itself is not movable and, therefore, a clearance must be provided between the chamber and the moving support and the inert gas inside the chamber leaks more or less through the clearance. A movable support such as belt used in an industrial production is for example as long as 50 m. If a gas tight chamber of 50 m in length, 1 m in width and 0.3 m in height is arranged over the movable belt, the volume of the chamber is 15 m$^3$ and an appreciable amount of inert gas is required for replacement of air inside the chamber. Moreover, in order to keep the pressurized state, it is necessary to always supply the inert gas to the chamber, for example, in an amount of 10 to 20 m$^3$/hour. The use of inert gas does not contribute to the yield of products and accordingly should be minimized from the economical point of view.

The above-mentioned method (3) dissolves the problems encountered by the methods (1) and (2), but has the disadvantage that since the covering film is in contact with the layer of the monomer solution before initiation of the polymerization, variation in thickness of the polymer gel owing to wrinkle occuring at the supply of the film or wrinkle resulting from shrinkage of the film caused by the heat of reaction. Ununiform thickness of the layer results in variation in polymerization rate. Further, since an inert gas is not introduced, oxygen enters to hinder the polymerization when the film is damaged or broken, thus no homogeneous polymer gel is obtained. Also, the continuous operation is interrupted by breakage of the film.

Another problem encountered by the process wherein a monomer solution is polymerized in the form of a thin layer on an moving support is that the peelability between the produced polymer gel and the moving support is poor when the support is made of a metal and when the produced polymer gel is very sticky, thus continuous operation is difficult.

Also, Japanese Patent Publication Kokai No. 60-149613 and No. 60-149612 disclose a process for preparing a water-soluble vinyl polymer by photopolymerizing a thin layer of an aqueous solution of a water-soluble vinyl monomer on a moving support, wherein a water-insoluble material such as an alkylene oxide adduct, a solid paraffin or a polydimethylsiloxane silicone oil is applied to the surface of the thin layer in the form of gel for the purpose of preventing vaporization of water and contact with oxygen in the gas atmosphere. According to this process, the obtained sheet-like polymer gel is ununiform in thickness and the both surfaces of the sheet-like gel is uneven.

It is known to provide a coating of polytetrafluoroethylene, polyester resin or the like on the surface of a movable support in order to improve the peelability of the produced sheet-like polymer from the moving support. However, the coating wears away during repeated use and the its peeling effect decreases. Also, the coating scratches easily. The monomer solution enters into the scratches and polymerizes therein, and when the produced polymer is forced to peel off from the moving support, the polymer getting into the scratches like anchor remains in the scratches and thereafter the peeling becomes difficult at these portions. Like this, when the coating scratches or exfoliates, the repair is required and the stop of the operation is unavoidable. In an industrial production of polymers, repair or recoating of a long-sized support results in a large loss of time and cost.

It is an object of the present invention to eliminate the above-mentioned defects of conventional processes.

This and other objects of the present invention will become apparent from the description hereinafter.

SUMMARY OF THE INVENTION

In accordance with the present invention, there is provided a process for continuously preparing an acrylic polymer gel using a photopolymerization apparatus including a movable support and a gas right chamber having a light permeable upper part which comprises:

(a) decreasing the dissolved oxygen in a monomer solution of at least one acrylic monomer containing a photopolymerization initiator to at most 1 mg/liter, (b) maintaining the concentration of oxygen in the gas phase inside a gas tight chamber arranged over a moving support at not more than 1% by volume, (c) continuously feeding a synthetic resin film onto the moving support from one end of the moving support, (d) continuously feeding the monomer solution in the form of a thin layer onto the resin film on the moving support, (e) irradiating the layer of the monomer solution with a light energy to initiate the polymerization and to cause the monomer solution to become substantially nonflowable, (f) continuously feeding a synthetic resin film and bringing the resin film into contact with the upper surface of the layer of the monomer solution when the monomer solution has become substantially nonflowable, (g) continuing the polymerization by the irradiation of light energy to produce a polymer in the form of gel, and (h) continuously peeling off the resin films on the both sides of the produced sheet-like polymer at the other end of the moving support and continuously taking out the sheet-like polymer from the moving support.

BRIEF DESCRIPTION OF THE DRAWINGS

FIG. 2 is a section view showing the inside of a gas-tight chamber in the apparatus of FIG. 1.

DETAILED DESCRIPTION

Figure 1:
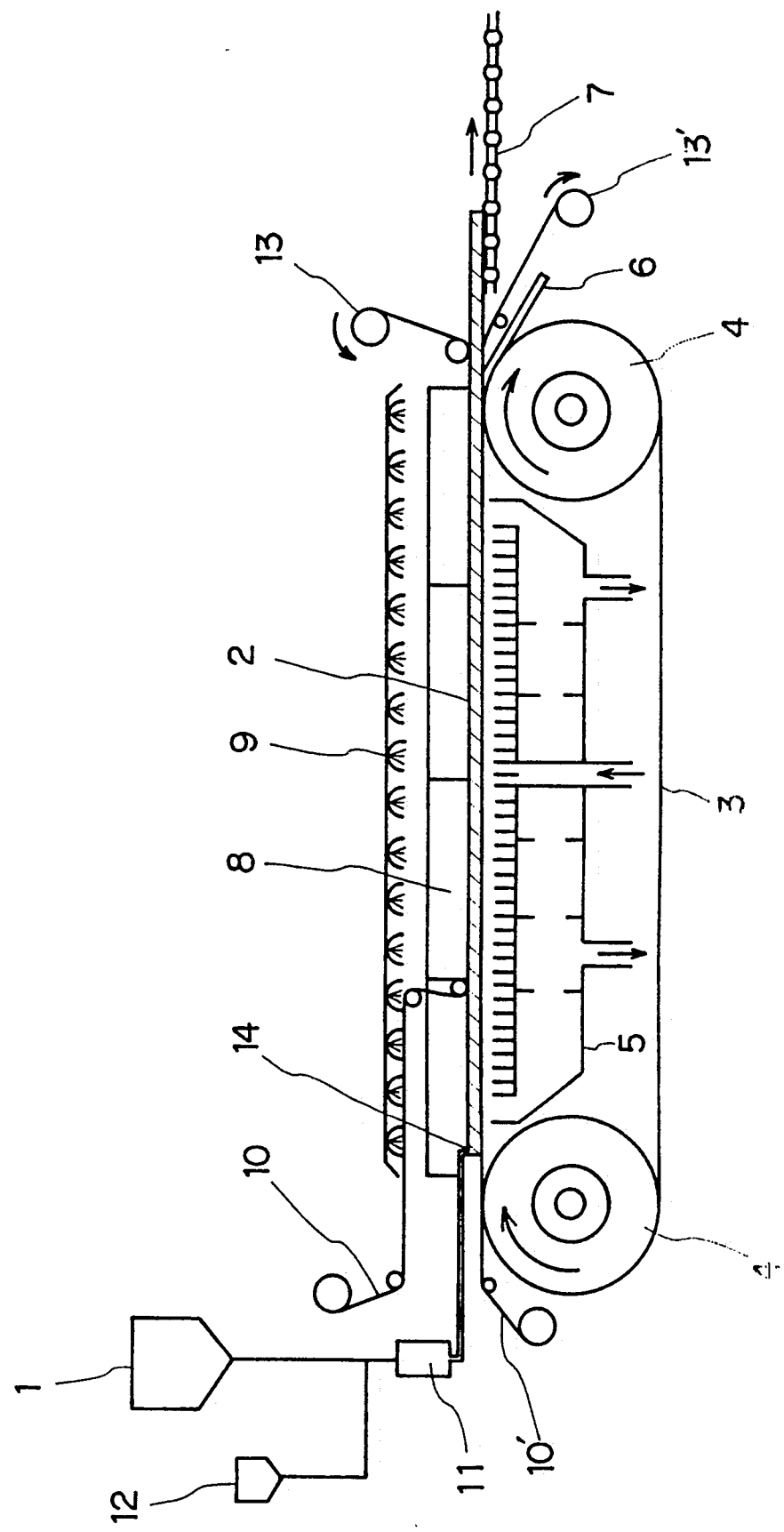
FIG. 1 is a schematic view showing an embodiment of an apparatus suitable for practicing the process of the present invention.

The process of the present invention is applicable to the preparation of known water-soluble acrylic polymers. Representative examples of the acrylic monomer used in the preparation of water-soluble polymers are, for instance, acrylamide, methacrylamide, their derivatives, acrylic acid, methacrylic acid, their salts, acid salts and quaternary salts of N,N-dialkylaminoalkyl acrylates or methacrylates, acidic salts of diallylamine, diallyldialkyl ammonium salts, sulfoalkyl acrylates or methacrylates, acrylamidealkyl sulfonic acids and their salts, and the like. These monomers are substantially soluble in water, and in general they are subjected to the polymerization in the form of an aqueous solution.

The process of the present invention is also applicable to the preparation of water-insoluble polymers. Representative examples of the monomers used for preparing water-insoluble polymers are, for instance, acrylamide, acrylates or methacrylates such as alkyl acrylates or methacrylates and hydroxyalkyl acrylates or methacrylates, styrene, vinyl acetate, and polyfunctional monomers which are used when crosslinked polymers are desired, such as methylenebisacrylamide, polyoxyethylene diacrylate or dimethacrylate, trimethylolpropane triacrylate or trimethacrylate and pentaerythritol tetraacrylate or tetramethacrylate. These monomers may be used alone or as a mixture thereof or may be used in combination with the substantially water-soluble monomers.

According to the purposes of the polymers to be prepared, the monomers as mentioned above are suitably selected and used in an arbitrary ratio. For instance, when it is desired to prepare a water-soluble polymer suitable for use as a paper reinforcing agent, a viscosity builder, a waste water treating agent or dehydrating agent for sewage and human waste, substantially water-soluble monomers are selected. When plastics are desired, hydrophobic monomers are used. Also, when water-swellable polymers useful for example as water-adsorbing resins are desired, substantially water-soluble monomers are used in combination with polyfunctional monomers such as methylenebisacrylamide.

In the case of preparing water-soluble polymers, monomers are used in the form of an aqueous solution usually having a monomer concentration of 20 to 80% by weight. When hydrophobic monomers are used, the monomers are used without diluting or by diluting with a suitable organic solvent, e.g. toluene or xylene, to a suitable concentration.

Usual photoinitiators can be used in the present invention, e.g. benzophenone, benzoin, a benzoin alkyl ether, and other photoinitiators such as azo compounds and peroxide compounds. The photoinitiator is used in an amount of 0.001 to 5% by weight based on the weight of the monomer or monomers used.

The dissolved oxygen in the monomer liquid to be polymerized and the oxygen present in the gas phase of the polymerization atmosphere should be decreased as low as possible, because oxygen exerts an adverse influence on the polymerization reaction. The dissolved oxygen in the monomer liquid is decreased to not more than 1 mg/liter in advance of the polymerization. When the amount of dissolved oxygen is more than 1 mg/liter, the unreacted monomer remains and the degree of polymerization is not raised. For the same reasons, the concentration of oxygen in the polymerization atmosphere, namely in the gas tight chamber, is maintained at not more than 1% by volume. The removal of oxygen can be attained by known methods. For example, after preparing a predetermined aqueous monomer solution and then adding a photoinitiator to the monomer solution, an inert gas such as nitrogen gas or carbon dioxide gas is introduced into the monomer solution. The oxygen in the polymerization atmosphere is removed, for example, by introducing an inert gas into the gas tight chamber.

A synthetic resin film is continuously fed onto a moving support over which gas tight chamber or chambers are arranged. The monomer liquid to which a photoinitiator is added, is then continuously fed in the form of a thin layer onto the resin film on the moving support. The thickness of the layer of monomer liquid is from 3 to 20 mm, preferably 5 to 10 mm. The layer of monomer liquid is irradiated with a light energy from light sources such as ultraviolet lamps which are arranged over the moving support and have been previously switched on, whereby the polymerization is initiated and the monomer liquid turns to a nonflowable state in a short time.

Another synthetic resin film is continuously fed over the moving support, and is brought into contact with the surface of the thin layer of monomer liquid when the monomer liquid has become substantially nonflowable. The time required for change into a substantially nonflowable state (a gel state) varies depending on monomer concentration, intensity of light energy and the like, but is usually from 1 to 5 minutes after irradiating the monomer layer. Thereafter, the polymerization is further continued by light energy irradiation. Preferably, the heat generated by the polymerization is removed, for example, by applying water to the back of the support during the polymerization. The resulting sheet-like polymer gel is continuously taken out from the other end of the moving support, while automatically peeling off the resin films on the both surfaces of the sheet-like polymer gel.

Generally available resin films are usually employed as the synthetic resin films to be fed on the surface of the moving support and the upper surface of the thin monomer layer, e.g. films of polyethylene, polypropylene, polyester, polyamide and polytetrafluoroethylene. In an industrial production of acrylic polymers, it is desirable that the cost is as low as possible and, therefore, a polyethylene film and a polypropylene film are preferably used from this point of view.

Since the resin films are continuously fed by a mechanical means and are forced to be peeled off the resulting sheet-like polymer at the other end of the moving support, if the resin films are too thin, they may be damaged, thus causing undesirable troubles such as stop of the operation owing to breakage of the films, or termination of the polymerization or generation of unreacted monomer. Preferably, the thickness of the resin films is from about 20 to about 50 $\mu$m.

A synthetic resin film rolled up in a cylindrical form, for example, a commertially available rolled film having a length of 2,000 to 4,000 m, is usually employed as the synthetic resin films to be fed on the both sides of the thin monomer layer. Joining of the films between one and another roll is made by means of a gum tape or an adhesive tape.

Each of the resin films withdrawn at the end of the moving support opposite the feed port of the monomer liquid is, for example, wound up in a cylindrical form, and if the film surface is not extremely contaminated, it may be reused.

When the moving support is made of stainless steel, some kinds of polymers strongly adhere to the surface of the support, and the peeling thereof from the support is conducted frequently with difficulty. In the process of the present invention, a synthetic resin film is fed on a moving support and a monomer liquid is fed on the resin film on the moving support and, therefore, such a problem of a conventional process has been completely eliminated. In addition, the process of the present invention has no problems of a conventional process mentioned before such as contamination of lamps or light-permeable partition plates arranged between the lamps and the moving support, influence of oxygen, ununiformity in thickness of polymer, etc., since a synthetic resin film is brought into contact with the upper surface of the gelled monomer liquid.

Before bringing a resin film into contact with the monomer layer on the moving support, the polymerization is conducted in the substantial absence of oxygen. After bringing the resin film into contact with the monomer layer, the surrounding gas is shut off by the resin film. Therefore, a single gas tight chamber may be arranged only over the region of the initial polymerization stage. When a plurality of gas tight chambers are provided, the introduction of an inert gas into the second and subsequent chambers may be decreased or stopped.

As light sources for irradiating the light energy to the monomer layer, usually available light sources can be used, e.g. xenon lamp, tungsten lamp, halogen lamp, carbon arc, and a mercury lamp such as high pressure mercury lamp, extra-high pressure mercury lamp or low pressure mercury lamp. The use of a high pressure mercury lamp is the most generic. The wavelength utilized varies somewhat depending on the kind of the photoinitiator used, but the range within 300 to 380 nm is the most effective.

In the present invention, an endless belt is preferably used as the movable support.

The process of the present invention has the following advantages.

(1) A rapid reaction and the accompanying bumping state of a monomer liquid can be prevented, whereby the monomer concentration can be maintained uniform and constant.

(2) Contamination of a ultraviolet lamp or a transparent partition plate by scattering of a monomer or a gelled liquid of monomer or monomer solution caused by a rapid reaction can be prevented, and the polymerization can be proceeded always under a constant illuminance. Consequently, it is possible to proceed the polymerization at a constant rate of polymerization and to obtain a polymer having a uniform degree of polymerization. Thus, not only the product having a stable quality is always obtained, but also cleaning work for lamp and partition plates is decreased and the productivity is remarkably raised.

(3) Since a light-permeable synthetic resin film is brought into contact with the thin layer of a monomer or a monomer solution in an inert gas stream when the monomer layer has turned to a substantially nonflowable state, the thin layer covered with the resin film is shut off the surrounding atmosphere. Therefore, even if the surrounding gas is not an inert gas after the thin layer is covered with the resin film, an adverse influence of oxygen is scarcely seen. Therefore, the gas tight chamber mentioned before can be made compact. The objects can be achieved even by introduction of a small amount of an inert gas, thus not only installation cost can be decreased, but also the use of undesirable inert gas can be minimized.

(4) When gas tight chamber or chambers are arranged over the full length of the moving support, interruption of continuous operation which is the most undesirable in industrial production can be prevented even if the synthetic resin film is damaged or broken.

(5) Since the upper surface of the thin layer of monomer liquid is covered with the resin film after the monomer liquid is caused to become substantially nonflowable, nonuniformity in the thickness of the layer of produced polymer can be extremely reduced.

(6) Since a synthetic resin film is also interposed between the thin monomer layer and the metallic moving support, the contact of the produced polymer with the support is prevented and there is no problem in peeling. Also, since it is not necessary to apply a releasing agent to the support, there is no contamination of the produced polymer with an impurity. Further, the heat of reaction can be removed more easily as compared with the use of a moving support having a lining of a fluorine-containing polymer, thus the reaction control is easy and polymers of a high quality are obtained.

(7) A high concentration of monomer and a large thickness of a monomer layer on a support can be adopted, thus polymers can be prepared in an improved high productivity.

(8) The obtained polymers in the form of sheet has very smooth surfaces.

(9) In the process of the present invention, gas-tight chamber or chambers filled with an inert gas are arranged over a moving support, for example, over at least the first half of the length of the moving support. In addition that the before-mentioned problems can be solved by bringing synthetic resin films into contact with the both surfaces of the gelled monomer layer on the moving support, the process of the present invention has the further advantage that the double sealing system by the covering of the monomer layer with resin films and the arrangement of gas-tight chamber can successfully prevent possible occurrence of various problems in continuous polymerization, such as polymerization hindrance caused by accidental oxygen inclusion which may frequently occur during continuous operation by severance or breakage cf covering films, expansion or shrinkage of covering films owing to the heat of polymerization, rise of vapor pressure of monomers or solvents, and insufficient press of covering films against rubber weirs or frames provided on the both side portions of the support.

As stated above, the present invention eliminates the problems of the prior art and provides a continuous process capable of stable preparing acrylic polymers by photopolymerization on an industrial scale.

The present invention is more specifically described and explained by means of the following Examples, in which all % are by weight unless otherwise noted. It is to be understood that the present invention is not limited to the Examples.

EXAMPLE 1 AND COMPARATIVE EXAMPLE 1

Acrylic polymers were continuously prepared by using the following aqueous solution of monomers, solution of a photoinitiator and polymerization apparatus. With respect to the case of feeding synthetic resin films to the apparatus (Example 1) and the case of not feeding the resin films (Comparative Example 1), the following tests were made.

The polymerization state in the reaction for 30 minutes was observed. The results are shown in Table 1.

Also, the apparatus was operated for a long time, and the contamination of the apparatus and the change in illuminance were observed. The results are shown in Table 2.

Further, the apparatus was operated for a long time, and the uniformity of the produced polymer in the form of gel was examined with the lapse of time. The results are shown in Table 3.

Aqueous Solution of Monomers

| [Aqueous solution of monomers] | |
| --- | --- |
| Ingredients | Amount (kg) |
| Acrylamide | 12.80 |
| Acrylic acid | 2.40 |
| Sodium hydroxide | 1.36 |
| Non-ionic surfactant (polyoxy-ethylene nonylphenyl ether: HLB 15) | 0.01 |
| Thiourea | 0.16 |
| Deionized water | 23.27 |
| total | 40.00 |

Solution of Photoinitiator

| [Solution of photoinitiator] | |
| --- | --- |
| Ingredients | Amount |
| Benzoin isopropyl ether | 6 g |
| Methanol | 147 ml |

Polymerization Apparatus

The apparatus shown in FIGS. 1 and 2 was used in the tests.

(1) A stainless steel endless belt 3 having a width of 450 mm and an effective length of 3,000 mm was driven by a rotating drum 4 at a rate of 100 mm/minute. As shown in FIG. 2, frames or wairs 16 made of a rubber are provided on the both side portions of the belt 3 for preventing the monomer solution from running over the belt.

(2) The endless belt was cooled with a cooling tank 5 by spraying water of 15° C. to the back surface of the belt.

(3) Four gas tight chambers 8 whose upper part was made of transparent glass 15 were arranged over the endless belt, and an inert gas (nitrogen gas) was introduced to each of the chambers in an amount of about 1 m$^3$/hour to control the oxygen in each chamber 8 to at most 0.8% by volume.

(4) Ultraviolet lamps 9 (low pressure mercury lamps) located at a height of about 100 mm over the chambers 8 were switched on, and the intensity of ultraviolet rays on the belt was adjusted to 20 W/m$^2$. Polyethylene film 10' having a thickness of 30 μm and a width of 500 mm was attached to the surface of the endless belt 3 at the inlet port of the first chamber 8, and was sent forward and set on an automatic winder 13' located on the exit side. The film 10' covered the surface of the belt 3 and the inner surfaces of the both frames 16 as shown in FIG. 2.

(5) Another polyethylene film 10 having a thickness of 30 μm and width of 500 mm was fed through the first gas-tight chamber 8 so that the film came into close contact with the upper surface of the aqueous monomer solution which had turned to a gel state, at the position of about 500 mm from the end 14 of the endless belt on the inlet side, namely monomer feed port 14, and was set on an automatic winder 13 located on the other side of the belt.

(6) The dissolved oxygen in the monomer solution placed in a monomer solution tank 1 was removed to less than 1 mg/liter by degassing with nitrogen gas, and the monomer solution was fed at a rate of 13.5 liters/hour onto the moving endless belt.

On the other hand, the photoinitiator solution placed in a tank 12 was degassed with nitrogen gas in the same manner to less than 1 mg/liter in oxygen concentration, and fed at a rate of 30 ml/hour. The monomer solution and the photoinitiator solution were uniformly mixed by a line mixer 11 arranged in a feed line, and fed onto the belt in the form of a layer having a thickness of 5 mm. The thus fed monomer solution (liquid temperature: about 20° C.) was irradiated with ultraviolet rays for 30 minutes on the belt.

(7) The polymerization started about 2 minutes after feeding the monomer solution on the belt (at the position of 200 mm from the inlet end 14 of the belt), and has changed to a nonflowable pudding-like gel about 4 minutes after the feeding (at the position of 400 mm from the inlet end). The polyethylene film 10 was brought into close contact with the surface of the gel 2 at the position of about 500 mm from the inlet end 14, and the gel covered with the film was sent to the other end of the endless belt while irradiating with ultraviolet rays. The polyethylene film 10 on the upper surface of the layer of the produced polymer gel was peeled off by the automatic film winder 13. The polymer gel ribbon having a width of 450 mm and a thickness of 5 mm was peeled off the belt 3 with the polyethylene film 10' by a peeling plate 6, and the film 10' on the back surface of the polymer gel ribbon was immediately wound up by the automatic film winder 13'. The polymer gel ribbon was then placed on and sent forward by a roller conveyor 7.

The machine was operated for about 3 hours, and the polymer gel ribbon of 18 m in length was obtained.

(8) The obtained polymer gel ribbon was cut into chips having a size of 3×5×5 mm, then pulverized to particles having a diameter of about 3 mm by a pulverizer, and dried at 80° C. for about 1 hour by fluidized drying.

The obtained polymer powder was soluble in water and gave an aqueous solution scarcely containing a water-insoluble material and having a high viscosity. The polymer had an intrinsic viscosity of 23.5 dl/g (1N-NaNO$_3$, 30° C.), and was useful as a flocculant.

TABLE 1

| | | (Polymerization state in reaction for 30 minutes observed under steady state) | | | |
|---|---|---|---|---|---|
| | | Example 1 | | Comparative Example 1 | |
| Time elapsed | | Temp. of polymer surface | State of polymer | Temp. of polymer surface | State of polymer |
| (a) | start of feeding | 20° C. | aqueous solution | 20° C. | aqueous solution |
| (b) | after 2 min. | 22° C. | aqueous solution | 22° C. | aqueous solution |
| (c) | after 4 min. | 30° C. | pudding-like | 30° C. | pudding-like |
| (d) | after 5 min. | 35° C. | soft gel | 43° C. | soft gel |
| (e) | after 10 min. | 60° C. | slightly hard gel | 76° C. | slightly hard gel |
| (f) | after 20 min. | 43° C. | slightly hard gel | 52° C. | hard gel |
| (g) | after 30 min. | 19° C. | hard gel | 20° C. | hard gel |

TABLE 2

| | | | (Observation of polymerization apparatus with the lapse of time in long run operation) | | | |
|---|---|---|---|---|---|---|
| | | | Example 1 | | Comparative Example 1 | |
| Position on belt (Distance from inlet port) | | Time elapsed (hour) | Glass of gas-tight chamber | Illuminance at belt surface (W/m$^2$) | Glass of gas-tight chamber | Illuminance at belt surface (W/m$^2$) |
| (a) | 500 mm | 1 | slightly cloudy | 19.5 | very cloudy | 18.5 |
| | | 2 | cloudy | 19.3 | presence of many water droplets | 18.0 |
| | | 3 | presence of water droplets | 19.1 | sticking of water droplets of polymer | 17.6 |
| (b) | 1000 mm | 1 | transparent | 19.8 | presence of many water droplets | 18.0 |
| | | 2 | transparent | 19.8 | sticking of much polymer | 17.4 |
| | | 3 | transparent | 19.6 | strong sticking of | 15.8 |

TABLE 2-continued (Observation of polymerization apparatus with the lapse of time in long run operation)

| Position on belt (Distance from inlet port) | Time elapsed (hour) | Example 1 | | Comparative Example 1 | |
|---|---|---|---|---|---|
| | | Glass of gas-tight chamber | Illuminance at belt surface (W/m$^2$) | Glass of gas-tight chamber | Illuminance at belt surface (W/m$^2$) |
| (c) 1500 mm | 1 | transparent | 19.7 | much polymer presence of many water droplets | 17.6 |
| | 2 | transparent | 19.5 | sticking of much polymer | 16.7 |
| | 3 | transparent | 19.4 | strong sticking of much polymer | 15.2 |
| (d) 2000 mm | 1 | transparent | 19.7 | presence of many water droplets | 17.3 |
| | 2 | transparent | 19.6 | sticking of much polymer | 16.7 |
| | 3 | transparent | 19.4 | strong sticking of much polymer | 15.0 |
| (e) 2500 mm | 1 | transparent | 19.5 | presence of water droplets | 17.8 |
| | 2 | transparent | 19.5 | slight sticking of polymer | 17.5 |
| | 3 | transparent | 19.4 | sticking of much polymer | 16.6 |
| (f) 3000 mm | 1 | transparent | 19.7 | cloudy | 18.8 |
| | 2 | transparent | 19.7 | presence of water droplets | 18.5 |
| | 3 | transparent | 19.6 | presence of many water droplets | 17.4 |

TABLE 3

(Uniformity of polymer gel)

| Time after start of feeding | Sampling position in polymer ribbon | Example 1 | | Comparative Example 1 | |
|---|---|---|---|---|---|
| | | Solid content of polymer gel (%) | Intrinsic viscosity (dl/g) | Solid content of polymer gel (%) | Intrinsic viscosity (dl/g) |
| 10 min. | 1 m | 40.8 | 23.7 | 41.8 | 23.5 |
| 50 min. | 5 m | 40.7 | 23.6 | 42.5 | 23.8* |
| 100 min. | 10 m | 40.9 | 23.9 | 42.9 | 23.0* |
| 150 min. | 15 m | 40.7 | 23.5 | 43.5 | 22.2** |
| 180 min. | 18 m | 40.6 | 23.4 | 43.3 | 22.0** |

(Notes)
*A water-insoluble material was seen in the aqueous solution.
**A large amount of a water-insoluble material was seen in the aqueous solution.

From the results shown in Table 2, it is understood that when a synthetic resin film is not fed (Comparative Example 1), the glass surface of gas-tight chambers is noticeably contaminated, whereby the illuminance is remarkably lowered.

EXAMPLE 2 AND COMPARATIVE EXAMPLE 2

Acrylic polymers were continuously prepared in the same manner as in Example 1 except that the amount of nitrogen gas introduced to the gas-tight chambers was changed. The state of the produced polymer was observed with respect to the case where the polyethylene films were fed (Example 2) and the case where no polyethylene films were fed (Comparative Example 2).

The results are shown in Table 4.

From the results shown in Table 4, it is apparent that inflow of N$_2$ gas can be remarkably decreased by covering the surface of the aqueous monomer solution in the gelled form with a synthetic resin film.

EXAMPLE 3 AND COMPARATIVE EXAMPLE 3

The following aqueous solution of monomers and the following photoinitiator solution were prepared.

TABLE 4

| Run No. | Amount of N$_2$ inflow (m$^3$/hour) | | | | Example 2 | | Comparative Example 2 | |
|---|---|---|---|---|---|---|---|---|
| | 1st chamber | 2nd chamber | 3rd chamber | 4th chamber | State of polymer gel ribbon | Polymerization conversion | State of polymer gel ribbon | Polymerization conversion |
| 1 | 1 | 1 | 1 | 1 | No unreacted monomer on both surfaces | 99.3% | No unreacted monomer on both surfaces | 99.3% |
| 2 | 1 | 1 | 1 | 0 | No unreacted monomer on both surfaces | 99.2% | Upper surface being somewhat soft and unreacted monomer being present | 98.3% |
| 3 | 1 | 1 | 0 | 0 | No unreacted monomer on both surfaces | 99.0% | Upper surface being somewhat soft and unreacted monomer being present much | 95.0% |
| 4 | 1 | 0 | 0 | 0 | Both edge portions on upper surface being somewhat soft | 98.5% | Unreaction being marked and no polymer gel being formed | about 50% |

Aqueous Monomer Solution

| [Aqueous monomer solution] | |
| --- | --- |
| Ingredients | Amount (kg) |
| β-Methacryloyloxyethyl-trimethylammonium chloride (80%) | 30.6 |
| Acrylamide (50%) | 11.1 |
| Polyoxyethylene distyrenated phenyl ether (HLB 12) | 0.015 |
| Sodium hypophosphite | 0.003 |
| Pure water | 8.3 |
| Total | 50.0 |

Photoinitiator Solution

| [Photoinitiator solution] | |
| --- | --- |
| Ingredients | Amount |
| Benzoin isopropyl ether | 6 g |
| Methanol | 147 ml |

An acrylic polymer was prepared in the same manner as in Example 1 except that the above monomer solution and initiator solution were used.

The temperature of the monomer solution began to rise about 3 minutes after feeding the aqueous monomer solution onto the moving belt, and turned to a nonflowable soft pudding-like state about 5 minutes later. At this point of time, a polyethylene film 10 sent from the upper part of a gas-tight chamber 8 was brought into close contact with the gel 2, and the polymerization was further continued on the moving belt 3. The polymerization temperature became maximum (58° C.) about 18 minutes after feeding the monomer solution.

The polymer gel obtained from the other end of the belt 30 minutes after feeding the monomer solution contained no unreacted monomers on the both surfaces thereof. The peelability of the polymer gel from the moving belt and the polyethylene films on the both surfaces was very good. Also, no unevenness was observed in the both surfaces of the obtained polymer gel, namely the polymer gel had smooth surfaces Also, in a long run test for about 4 hours, contamination and cloudiness of the glass surface of the gas-tight chambers did not occur at all. The illuminance of ultraviolet rays at the belt surface was from 19.2 to 20.0 W/m$^2$ and the decrease of illuminance was very small.

The obtained polymer gel ribbon of about 22 m in length was examined to determine the variation in quality. The results are as follows:

| Solid content of polymer gel |
| --- |
| Minimum: 59.6% |
| Maximum: 61.0% |
| Intrinsic viscosity of polymer |
| Minimum: 8.0 dl/g |
| Maximum: 8.3 dl/g |

For comparison, the above procedure was repeated except that the polyethylene film was not fed onto the upper surface of the monomer solution layer on the belt (Comparative Example 3). The contamination and cloudiness of the glass surface of the gas-tight chambers increased with the lapse of time, and the light intensity required for the polymerization could not be ensured.

The states of the produced polymer gel in the long run test are shown below.

| Time elapsed after feeding monomer | State of polymer gel |
| --- | --- |
| After 1 hour | The both surfaces are good. |
| After 2 hours | The back surface is soft. |
| After 3 hours | The upper surface is soft and unreacted monomers remain somewhat in the back surface. |
| After 4 hours | Unreacted monomers remain somewhat in the upper surface and much in the back surface. |

COMPARATIVE EXAMPLE 4

An acrylic polymer was continuously prepared by using the same apparatus as used in Example 1 except that no gas-tight chamber was provided over the endless belt, and a rubber rod having a length of 1,000 mm and a diameter of 30 mm for pressing a synthetic resin film down was arranged laterally against the machine direction in contact with the upper part of rubber frames 16 provided on the both side portions of the belt at the position of 200 mm from the monomer feed port 14.

The preparation of the polymer was carried out in the same manner as in Example 1 except that the aqueous monomer solution was fed between the upper and lower polyethylene films 10 and 10' while blowing a nitrogen gas between the polyethylene films in order to shut off the contact with air, and the upper polyethylene film was brought into contact with the surface of the aqueous monomer solution immediately after feeding the aqueous monomer solution onto the lower polyethylene film on the moving belt.

The monomer solution fed and irradiated with ultraviolet rays at 20 W/m$^2$ began to polymerize about 2 minutes after feeding (at the position of about 200 mm from the monomer feed port), and changed into a pudding-like nonflowable gel about 4 minutes after feeding (at the position of about 400 mm from the monomer feed port). The surface temperature of the gel reached maximum (68° C.) about 9 minutes after feeding the monomer solution (at the position of about 900 mm from the monomer feed port). The polymerization proceeded during traveling to the other end of the belt. The upper and lower polyethylene films were peeled at the end of the belt by automatic film winders 13 and 13', thus a polymer gel ribbon having a width of 450 mm and a thickness of 5 mm was continuously obtained.

After 95 minutes from starting the feed of the monomer solution, the end of the upper polyethylene film was joined to another roll of the polyethylene film with an adhesive tape, and the film was successively fed. At the position near reaching the maximum temperature (about 900 mm from the monomer feed port), the joined portion of the film broke due to expansion of the film by heat, and the film began to peel forward with snaking and the gel was exposed to the air. The operation was immediately stopped, the film was joined and the operation was started again. The time required for jointing the film was about 15 minutes.

The obtained polymer gel ribbon was examined to determine the quality. The results are shown in Table 5.

TABLE 5

| Time after start of feeding* | Sampling position in polymer ribbon | Solid content of polymer gel (%) | Intrinsic viscosity (dl/g) | Polymerization conversion (%) |
| --- | --- | --- | --- | --- |
| 10 min. | 1 m | 40.7 | 22.8 | 98.0 |
| 50 min. | 5 m | 40.5 | 22.5 | 98.3 |
| 100 min. | 10 m | 41.3 | 17.2 | 76.2 |
| 150 min. | 15 m | 40.8 | 22.3 | 98.2 |
| 180 min. | 18 m | 40.6 | 22.7 | 98.1 |

*Time of stopping the operation is excluded.

As shown in Table 5, about 500 mm portion of the gel exposed to air was incomplete in polymerization.

Also, the obtained polymer gel was poor in smoothness of its upper surface.

In addition to the ingredients used in the Examples, other ingredients can be used in the Examples as set forth in the specification to obtain substantially the same results.

What we claim is:

1. A process for continuously preparing an acrylic polymer gel using a photopolymerization apparatus including a movable support and a gas tight chamber having a light permeable upper part which comprises:
   (a) decreasing the dissolved oxygen in a monomer solution of at least one acrylic monomer containing a photopolymerization initiator to at most 1 mg/liter,
   (b) maintaining the concentration of oxygen in the gas phase inside a gas tight chamber arranged over a moving support at not more than 1% by volume,
   (c) continuously feeding a synthetic resin film onto the moving support from one end of the moving support,
   (d) continuously feeding the monomer solution in the form of a thin layer onto the resin film on the moving support,
   (e) irradiating the layer of the monomer solution with a light energy to initiate the polymerization and to cause the monomer solution to become substantially nonflowable,
   (f) continuously feeding a synthetic resin film and bringing the resin film into contact with the upper surface of the layer of the monomer solution when the monomer solution has become substantially nonflowable,
   (g) continuing the polymerization by the irradiation of light energy to produce a polymer in the form of gel, and
   (h) continuously peeling off the resin films on the both sides of the produced sheet-like polymer at the other end of the moving support and continuously taking out the sheet-like polymer from the moving support.

2. The process of claim 1, wherein each of said synthetic resin films fed onto the moving support and onto the upper surface of the monomer solution layer is a member selected from the group consisting of polyethylene film, polypropylene film, polyester film, polyamide film and polytetrafluoroethylene film.

3. The process of claim 1, wherein each of said synthetic resin films fed onto the moving support and onto the upper surface of the monomer solution layer has a thickness of 20 to 50 μm.

4. The process of claim 1, wherein said synthetic resin film fed onto the upper surface of the monomer solution layer is a light-permeable film.

5. The process of claim 1, wherein said gas tight chamber is arranged only over the first half of the length of said moving support.

6. The process of claim 1, wherein said concentration of oxygen is maintained by introducing an inert gas into said gas tight chamber.

7. The process of claim 6, wherein said inert gas in nitrogen.

* * * * *